United States Patent [19]
Megahed

[11] 3,907,598
[45] Sept. 23, 1975

[54] SEALED LOW DRAIN RATE DRY CELL HAVING IN SITU STABLE DIVALENT SILVER OXIDE DEPOLARIZER

[75] Inventor: El Sayed Megahed, Madison, Wis.

[73] Assignee: ESB Incorporated, Philadelphia, Pa.

[22] Filed: Apr. 26, 1973

[21] Appl. No.: 354,782

[52] U.S. Cl. ................................ 136/107
[51] Int. Cl. .......................... H01m 21/00
[58] Field of Search ............... 136/107, 102, 20, 30

[56] References Cited
UNITED STATES PATENTS

| | | | |
|---|---|---|---|
| 2,650,945 | 9/1953 | Herbert | 136/107 X |
| 3,476,610 | 11/1969 | Krebs et al. | 136/107 |
| 3,484,295 | 12/1969 | Dawson | 136/107 X |
| 3,530,496 | 9/1970 | Amano et al. | 136/107 X |
| 3,615,858 | 10/1971 | Soto-Krebs | 136/107 |
| 3,617,384 | 11/1971 | Kamai | 136/107 X |
| 3,655,450 | 4/1972 | Soto-Krebs | 136/107 |

*Primary Examiner*—John H. Mack
*Assistant Examiner*—C. F. Lefevour

[57] ABSTRACT

A sealed low drain rate dry cell having an electronegative metal anode, a metal hydroxide electrolyte and in situ stable divalent silver oxide depolarizer.

16 Claims, 7 Drawing Figures

DECOMPOSITION AND GAS EVOLUTION OF DIVALENT SILVER OXIDE IN 18% NaOH PLUS 1.25% ZnO GASSING APPARATUS KEPT CONSTANTLY AT 165°F

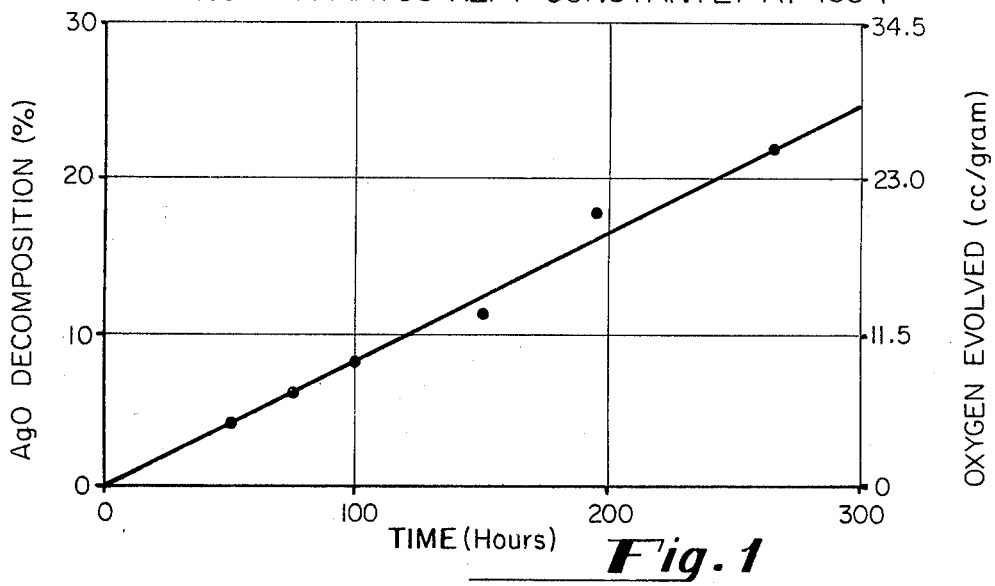
Fig. 1 — DECOMPOSITION AND GAS EVOLUTION OF DIVALENT SILVER OXIDE IN 18% NaOH PLUS 1.25% ZnO GASSING APPARATUS KEPT CONSTANTLY AT 165°F
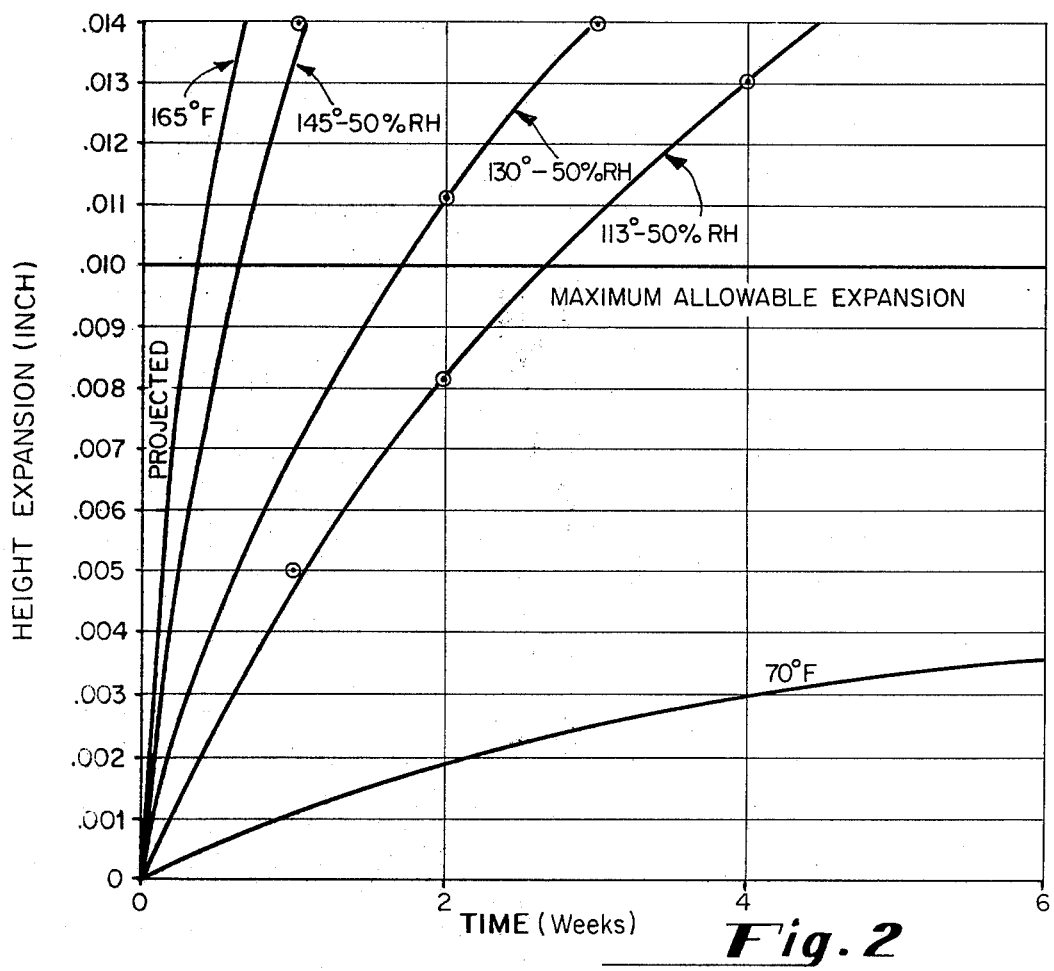
Fig. 2 — BULGING OF 41 SIZE CELLS MADE WITH 46% KOH +7% ZnO AS THE CELL ELECTROLYTE

SEALED LOW DRAIN RATE DRY CELL HAVING IN SITU STABLE DIVALENT SILVER OXIDE DEPOLARIZER

BACKGROUND OF THE INVENTION

1. Field of the Invention

This invention relates to a sealed low drain rate dry cell having a stable divalent silver oxide depolarizer and more particularly to a cell for low drain rate applications which utilizes a metal hydroxide electrolyte in molar concentrations of from about 0.5 molar to about 6.0 molar. This cell will have particular utility as energy source in areas such as the electric or electronic watch industry.

2. Description of the Prior Art

Industries such as the electric or electronic watch industry, are particularly aware of, and sensitive to, the specific energy source utilized in their final product, demanding, for example, at least two years of storage at room temperature and one year of service from any portable power source utilized in electric or electronic watches. Thus, the property of energy density per unit volume for the battery utilized becomes of utmost importance. In addition to the property of high energy density per unit volume, a battery to be useful in an area such as electric or electronic watch industry must likewise discharge all of its useful energy at a drain rate of one microampere to one milliampere average current.

Monovalent silver oxide-zinc batteries are known in the prior art. These cells are normally made with high concentrations of caustics "mostly potassium and sodium hydroxide" because of high drain rate, leakage and shelf like considerations. This is done since cells with low caustic concentration will normally have poor shelf life because of leakage and barrier deterioration and poor capacity maintenance because of cell shorting and ion migration to the anode. For these reasons, neither monovalent nor divalent silver oxide-zinc cells have been commercially made with caustic concentrations below 20 percent by weight of sodium hydroxide or equivalent of potassium hydroxide, lithium hydroxide, rubidium hydroxide, or cesium hydroxide.

Theoretically, a divalent silver oxide-zinc system has 1.87 times more capacity per gram than the monovalent oxide and has 1.95 times more capacity per unit volume than the monovalent oxide. Practically, cells made with divalent silver oxide depolarizers will give 30 to 40 percent more capacity than equivalent cells made with monovalent silver oxide depolarizers.

Constructing divalent silver oxide-zinc cells with high concentrations of caustics (i.e., more than 20 percent of NaOH or equivalent of other alkali hydroxides) will normally produce cells with a serious problem caused by the instability of divalent silver oxide in situ, i.e. in cells. Divalent silver oxide evolves gaseous oxygen in the presence of alkali which leads to cell rupture and consequently sealed divalent silver oxide-zinc cells were not heretobefore commercially practicable. Further, the unstable divalent silver oxide in divalent silver oxide-zinc cells is known to effect poor shelf lift and capacity maintenance of cells stored on shelf or at elevated temperatures.

A stable, sealed divalent silver oxide containing cell has now been discovered which utilizes an electronegative metal anode, a metal hydroxide electrolyte in diluted concentration and in situ, i.e. in the cell, stable divalent silver oxide depolarizer. This cell is useful for low rate applications; has a good shelf life; has a greater capacity than comparable monovalent silver oxide depolarized cells and has a high capacity retention.

SUMMARY OF THE INVENTION

This invention is directed to a sealed low drain rate dry cell comprising in combination:
  a. an electronegative metal anode;
  b. a metal hydroxide electrolyte;
  c. a cell barrier; and
  d. an in situ stable divalent silver oxide depolarizer, wherein the molar concentration of the metal hydroxide in the electrolyte is from about 0.5 molar to about 6.0 molar.

DESCRIPTION OF THE DRAWINGS

1. FIG. 1 is a graphic representation of AgO Decomposition and the Gas Evolution in a laboratory gassing apparatus as functions of time.

2. FIG. 2 is a graphic representation of Cell Height Expansion due to gassing in cells outside the scope of this invention as a function of time.

DESCRIPTION OF THE INVENTION

Figure 3:
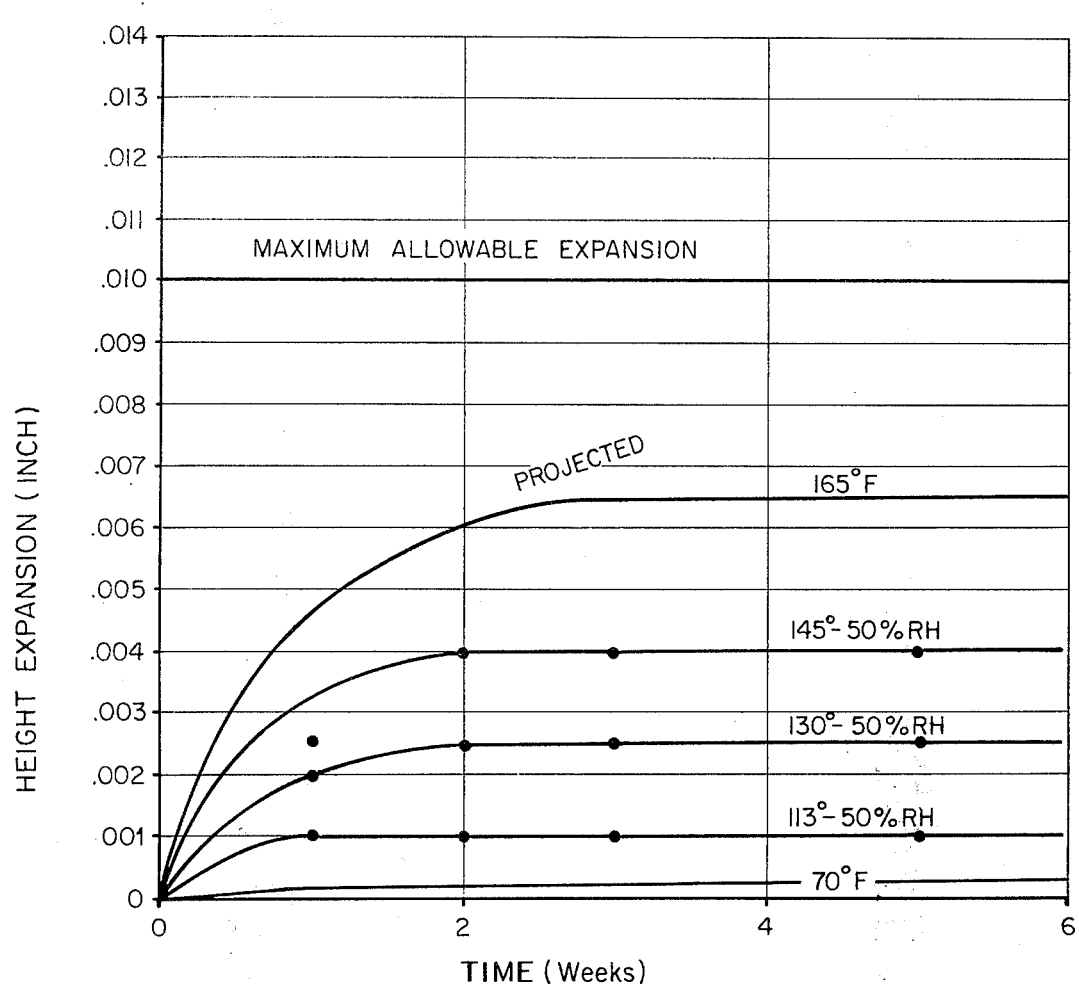
FIG. 3 is a graphic representation of Cell Height Expansion due to gassing in cells of this invention as a function of time.

A novel sealed low drain rate dry cell has now been discovered for low drain rate applications. The cell comprises in combination an electronegative metal anode, a metal hydroxide electrolyte, a cell barrier and an in situ stable divalent silver oxide depolarizer.

The negative electrode or anode of the cell of this invention may be made of any suitable electronegative metal and one skilled in the art can readily ascertain which electronegative metal should be used depending on the particular application of the cell being produced. Examples of useful electronegative metals are magnesium, aluminum, titanium, manganese, cadmium, and indium but zinc, which is commonly used in alkaline batteries for practical reasons such as cost, availability, etc., is a preferred anode material. Gelled or semi-gelled zinc is most preferred and may be prepared by any method known to those skilled in the art, for example, by the addition of 0.2 percent carboxymethyl cellulose (CMC) to screened and amalgamated zinc.

The cell barrier of the cells of this invention may be of any suitable semi-permeable material but should permit the free passage of ions during discharge either through pores in the body of the barrier or via electrolyte absorbed within the barrier area itself. At the same time the barrier selected must slow ion migration and dendritic growth during periods of non-use or slow and/or intermittent use thus slowing the resultant self-discharging and extending shelf life. The preferred barrier material is a Permion No. 2291 (extruded polyethylene grafted with methacrylic acid, e.g. by atomic radiation).

The novel cell of this invention has now been discovered wherein the utilization of an aqueous metal hydroxide electrolyte having a molar concentration range of from about 0.5 molar to about 6.0 molar results in a dry cell which, wholly unexpectedly, is useful and efficient while supporting a drain rate of one milliampere per square centimeter or less. The preferred drain rate is from about 1 microampere to about 1 milliampere per $cm^2$ of active material.

It is wholly unexpected that the desired energy can be derived from the cells of this invention with their low caustic concentration, i.e. the capacity or cell efficiency of these cells is unexpected and unpredictable. Rather, one would expect polarization, i.e. zinc polarization, in silver-zinc cells of this invention having the low concentration of caustic of this invention to be so great as to result in low efficiency and failure to support the desired drain rate.

By the term "metal hydroxide" as used herein is meant hydroxides of the metals lithium, sodium, potassium, rubidium, cesium and mixtures thereof. Depending upon the particular metal hydroxide employed in a specific cell the useful concentration ranges for each of the metal hydroxides listed above within the general concentration of from about 0.5 molar to 6.0 molar and expressed as weight percent based on the total weight of the electrolyte are as follows:

sodium hydroxide about 2.0-20.0
lithium hydroxide about 1.2-13.0
potassium hydroxide about 3.0-25.0
rubidium hydroxide about 5.0-40.0
cesium hydroxide about 7.5-50.0

Electrolytes below these concentrations will not support the rates approaching 1 milliampere per square centimeter while electrolytes above these concentrations will support the drain rate but will also cause the divalent silver oxide to gas severely in the cells.

Since commercial metal hydroxide electrolytes often contain small amounts of other materials, i.e. contaminants, and since other materials such as zinc oxide are often added even to their saturation point to suppress anode gassing, such materials may also be present in the electrolyte of this invention but they are not necessary to the invention or the beneficial results of the invention. The term "metal hydroxide electrolyte" as used herein is therefore intended to include electrolytes having such materials therein as well as alkaline solutions without such additive materials.

The depolarizer in a cell of the present invention comprises divalent silver oxide as the active cathodic material. It is preferred that the divalent silver oxide active material comprise at least 50 percent by weight of the total cathodic material to provide a battery active material having higher capacity. The rest of the cathodic depolarizer could be an inert component(s), i.e., carbon, Teflon, etc. or another active material that may give useful capacity include monovalent silver oxide ($Ag_2O$), manganese dioxide ($MnO_2$), nickelic oxyhydroxide (NiOOH), mercuric oxide (HgO), cupric or cuprous oxides (CuO or $Cu_2O$) and the like. Examples of active material that may not give useful capacity include silver powder (Ag), nickel hydrate ($Ni(OH)_2$), mercury (Hg), copper powder (Cu) and the like.

Stability of divalent silver oxide has been studied by many persons skilled in the art and the article by Paul Ruetschi on "Recent Studies on the Nature and Stability of Silver Oxides" pages 117 to 131 in the *Zinc-Silver Oxide Batteries* edited by Arthur Fleischer and John J. Lander summarizes the effect of caustics, particularly potassium hydroxide, on stability of divalent silver oxide. In the article, it was shown that gassing of divalent silver oxide increased linearly with time as the potassium hydroxide concentration increased from 1 to 50 percent by weight and the effect is more pronounced at higher temperatures. These results were derived from a laboratory-made gassing apparatus and have since been confirmed using sodium hydroxide and divalent silver oxide in a similar gassing apparatus (see FIG. 1 herein). This linear relationship between the gas evolved from divalent silver oxide with time has discouraged the use of divalent silver oxide as a depolarizer in batteries. If was feared that sealed cells would rupture once the oxygen pressure reached a high limit and this was confirmed in cells made with potassium hydroxide concentrations higher than the range specified in this invention (see FIg. 2 herein, RH in figures means relative humidity).

The caustic concentrations specified in this invention produce in situ, i.e. in the cell, stable divalent silver oxide-zinc cells. Cell expansion is not linear with time in the cells of this invention. Cells of this invention were shown to reach a maximum allowable expansion of less than 0.010 inch after which cell expansion ceased (FIG. 3). This maximum allowable expansion is influenced by time, caustic concentration, temperature and cell construction (i.e. amount of divalent silver oxide in cells). The lower the caustic concentration the less time required for cell expansion to cease. For example, cells made with 10 percent potassium hydroxide plus 1 percent zinc oxide cease to expand after one week of storage in an oven of 113°F and 50 percent relative humidity while cells made with 46 percent potassium hydroxide plus 7 percent zinc oxide continue to expand beyond 1 week in the same environment until cell rupture after 6 weeks. Maximum cell expansion is also affected by caustic concentrations and elevated temperatures and this is evidenced by FIGS. 2 and 3 herein. Although data shown in FIG. 2 for dry cells made with 46 percent potassium hydroxide plus 7 percent zinc oxide as the cell electrolyte did not reach the maximum allowable expansion (0.010 inch) in 6 weeks time at 70°F, the data indicated that cells kept for 24 months at the same temperature would most likely exceed this limit of 0.010 inch thus making this cell unfit for practical use. In addition, those skilled in the art realize that elevated temperatures of 113°F to 165°F are within the scope of reality for battery applications especially during the summer months in both tropical and subtropical regions of the world and such conditions necessitate the use of electrolyte ranges set forth in this invention so that the maximum cell expansion is tolerable.

Figure 4:
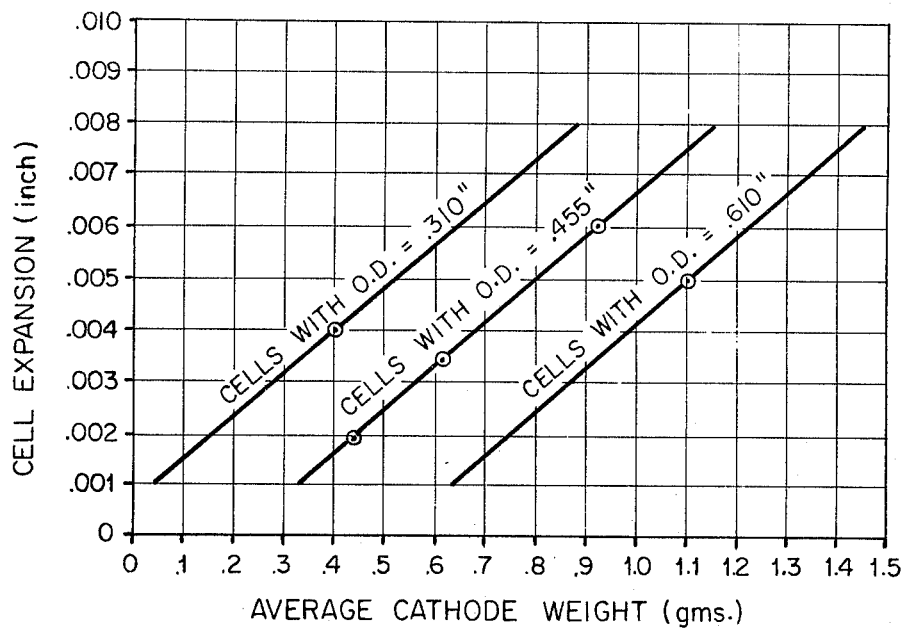
FIG. 4 is a graphic representation of Cell Bulging in cells of this invention as a function of Average Cathode Weight in grams.

Using the specified electrolyte ranges, battery engineers can balance cell design so the amount of gas evolved expressed as cell expansion can be assessed. FIG. 4 herein illustrates test results derived from cells constructed with 18 percent sodium hydroxide plus 1.25 percent zinc oxide as the cell electrolyte and exposed to the highest reasonable temperature a battery may face in a practical use (165°F). Bulging of these cells is in this instance dependent on the amount of cathode material and cell diameter (surface area of the cathode). With constant cell diameter, increasing cell height (amount of cathode) will cause an increase in cell bulging. With constant amount of cathode material, increasing cell diameter will cause a decrease in cell bulging. By varying electrolyte concentration within the specified ranges or varying the metal hydroxide as set forth herein to be used as the cell electrolyte, batteries of various sizes and configurations can be made to meet specified low drain rate applications.

The depolarizer in the foregoing cells comprises "in situ", i.e. in the cell, stable divalent silver oxide. As used herein the term "stable divalent silver oxide" means AgO having a maximum gassing rate of 500 microliters per gram per hour in 2 percent potassium hydroxide solution at 165°F. This oxide is classified as "unstable" in cells made with sodium hydroxide concentration above 20 percent by weight or equivalent of the other metal alkali and becomes "stable" in cells made with electrolyte concentration specified in the embodiment of this invention. Any divalent silver oxide material that results in a gassing rate below the 500 microliters range will be preferred as the depolarizer in silver-zinc batteries and values of 100 microliters or less are most preferred. Useful divalent silver oxide may be purchased (i.e., Ames, GAF Corporation, Glens Falls, N. Y., etc.) or may be prepared by any of the various methods known in the art as long as the resultant product meets the criteria of the definition herein above. For example, monovalent silver oxide can be dry ozonated or slurry ozonated in an 18 percent sodium hydroxide solution, or persulfate synthesized to AgO. (See U.S. Pat. No. 3,655,450 (Soto-Krebs)). As stated above, any divalent silver oxide meeting the criteria set forth herein is useful in this invention. Slurry ozonated divalent silver oxide is preferred for use in low drain rate sealed cells as compared to dry ozonated divalent silver oxide, persulfate synthesized or electrochemically formed divalent silver oxide.

A low drain rate power system which could utilize a cell of this invention comprises a power consuming device such as an electronic watch and the sealed low drain rate dry cell itself. The power consuming device will be in electrical contact with a cell of this invention and this electrical contact could be accomplished by any means known in the art.

Commonly, in electronic watch use for example, physical and electrical contact between the cell and the power consuming device are accomplished by one and the same means, i.e. the cell is fitted into the device in a manner which effects pressure contact, both electrical and physical, therebetween. In this type of situation the actual low drain rate of the cell will be dictated by the cell construction itself and the power needs of the consuming device and will be determined before the assembly of the system and invariable throughout the useful life of the cell. The cell will therefore discharge and power the consuming device at the constant low drain rate. If, however, a separate electrical contact means is used between the device and the cell, the drain rate of the cell can be varied during operation of the device by placing in the contacting electrical connector a device such as a variable resistor. The cell will therefore discharge and power the consuming device at the low drain rate dictated by the variable resistor. If a standard resistor is used the cell will discharge a constant rate as dictated by the standard resistor. The particular electrical contact to be used can be readily determined by one skilled in the art once the use to which the cell is to be put; the nature of the consuming device; and the particular power requirements of the device are ascertained.

In addition to varying the drain rate of the cell of the system by the introduction of a means such as a variable resistor, the drain rate can, of course, also be varied by placing more than one such cell in a parallel configuration if the physical configuration of the consuming device would so permit. The drain rate of such cells in parallel would be the additive drain rate of the individual cells.

Figure 5:
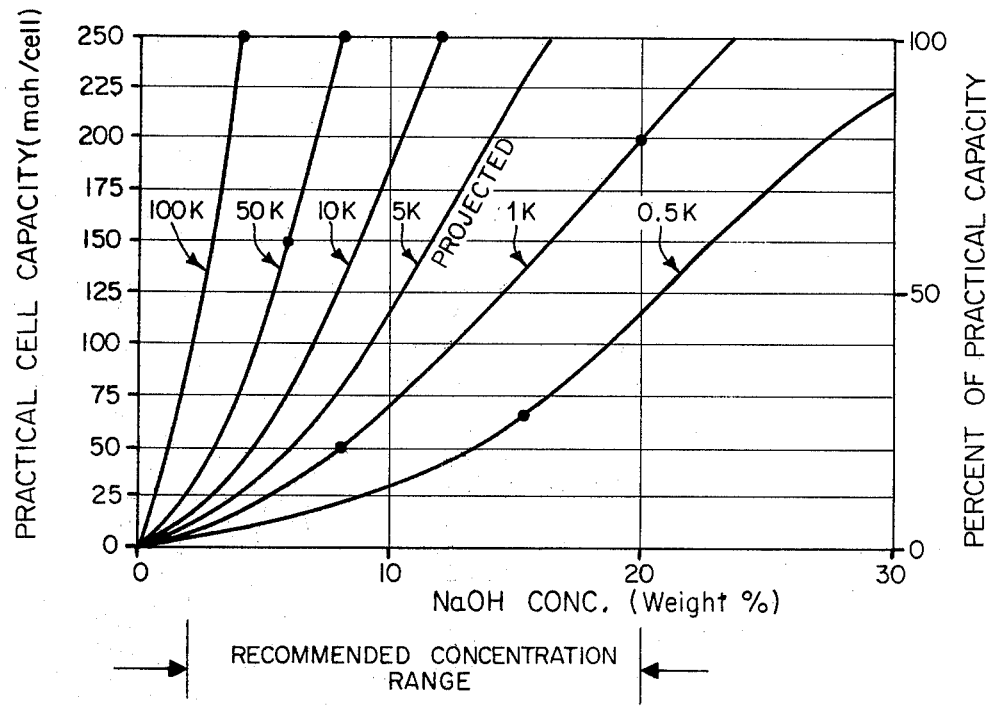
FIG. 5 is a graphic representation of Practical Cell Capacity in milliampere hours per cell as a function of metal hydroxide electrolyte concentration.

The stable cell of the invention when used for low drain applications (i.e., electric or electronic watches) should deliver most, if not all, of its rated capacity. For example, a 76 size cell (0.455 inch outside diameter, 0.210 inch high and 0.033 in.$^3$ volume) made with 18 percent sodium hydroxide plus 1.25 percent zinc oxide as the cell electrolyte will deliver all of its rated capacity when discharged across any load higher than 5K ohms (light drains). The same cell will deliver part of its rated capacity when discharged across any load lower than 5K ohms (high drains). Cells made with other concentrations of cell electrolyte between 2.0 and 20 wt. percent sodium hydroxide or equivalent of the other caustics will deliver various amounts of capacity according to the load put across. (see FIG. 5 herein). These cells will deliver all their rated capacity when discharged across 100 K ohms or higher making them ideally suited for the watch industry.

Figure 6:
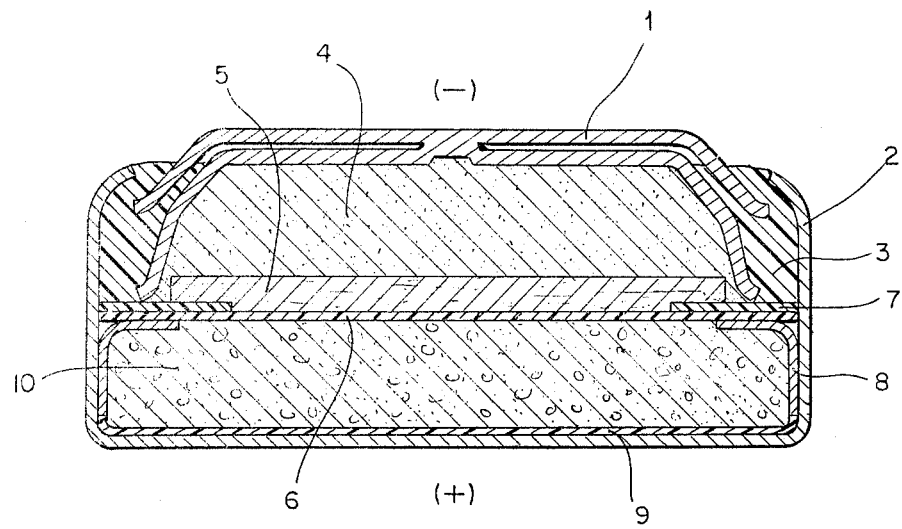
FIG. 6 is a cross-sectional view of a primary silver-zinc cell according to this invention.

Referring now to FIG. 6, this Figure is a cross-sectional view of a primary silver-zinc cell according to this invention. The cell has a two part container comprising an upper section or cap 1 which houses the negative electrode or anode, and a lower section or cup 2 which houses the positive electrode or cathode. The bottom cup 2 may be made of any suitable material such as nickel plated steel and the cap 1 may likewise be made of any suitable material such as tin plated steel. Cap 1 is insulated from the cup 2 by means of an insulating and sealing collar 3 which may be made of any suitable resilient electrolyte-resistant material such as high density polyethylene or neoprene and it may be integrally molded around the edges of the cap 1 for insulating the cap from the can 2 and also to constitute an airtight enclosure therewith.

The negative electrode 4 of the cell comprises for example, a gelled or semi-gelled zinc. The zinc electrode 4 is separated from the positive electrode by means of an electrolyte-absorbent layer 5 and a membrane barrier 6. The electrolyte-absorbent layer 5 may be made of electrolyte-resistant highly absorbent substances such as matted cotton fibers. Such a material is available commercially under the trademark "Webril". The barrier layer 6 may be any suitable semi-permeable material such as cellophane in combination with polyethylene grafted by chemical initiators with methacrylic acid or cellophane in combination with "Permion" 2291 (extruded polyethylene grafted with methacrylic acid by atomic radiation). Such material is described by Vincent D'Agostino, J. Lee and G. Orban "Grafted Membranes" pages 271 to 281 in *Zinc-Silver Oxide Batteries* edited by Arthur Fleischer and J. J. Lander, John Wiley & Sons, Inc. A guard ring 7 made of any suitable plastic material such as polystyrene, polyethylene and polypropylene is situated between sealing collar 3 and barrier 6 to prevent the top assembly 1-5 from cutting through barrier 6 when the cell is closed under pressure.

The positive electrode 10 of the cell is divalent silver oxide and is isolated from the can 2 by means of a zinc plated mix sleeve 8 and a liner 9 at the bottom of the can which may be of zinc or a suitable material such as polyethylene. In the event that the liner 9 at the bottom of can 2 is zinc, the cell is discharged at the monovalent silver oxide voltage level through the zinc liner 9 at the bottom of the can and through the zinc plated mix sleeve 8, with the divalent silver oxide being reduced to monovalent silver oxide upon contact with the zinc sleeve and/or liner. In the event that the liner 9 on the bottom of can 2 is of a material such as polyethylene, the cell is discharged at the monovalent silver oxide voltage level through the zinc plated mix sleeve only and in this case the capacity which would be exhausted by the zinc liner is saved.

Figure 7:
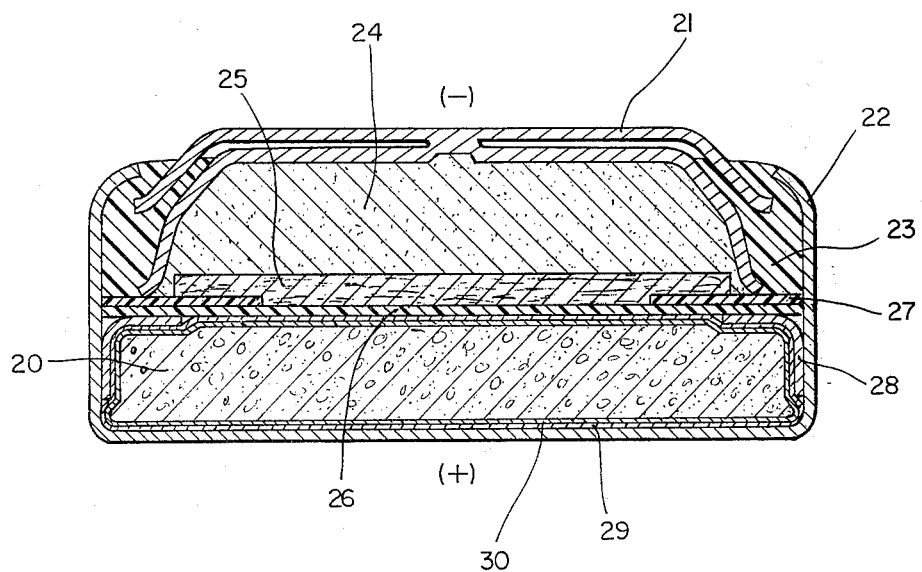
FIG. 7 is a cross-sectional view of another primary silver-zinc cell according to this invention.

FIG. 7 is a cross-sectional view of another primary silver-zinc cell according to this invention. In this FIG., items 21-27 correspond both in function and in material of construction to items 1-7 of FIG. 6.

The positive electrode 20 is a pellet of divalent silver oxide encased by a thin layer of silver metal 29 with a thin layer of monovalent silver oxide 30 situated therebetween. This pellet when placed in the cell even without a zinc liner or zinc plated mix sleeve would result in a discharge of the cell at a monovalent silver oxide voltage level. The mix sleeve 28 of this cell can therefore be made of any suitable material such a nickel plated steel and there is no need for a liner in the bottom of the can.

In both FIGS. 6 and 7 there is present throughout the cell and particularly concentrated in absorbent layer 5 or 25, an aqueous metal hydroxide electrolyte according to this invention which electrolyte is present in the concentrations set forth herein.

EXAMPLES

The following examples further illustrate the improved characteristics of cells of this invention. These examples are intended to be merely illustrative of the invention and not in limitation thereof. Unless otherwise indicated, all quantities are by weight.

EXAMPLE 1

Cells (75 size; 0.455 inch dia., 0.210 inch height, and 0.034 in³ volume) were constructed according to FIG. 6 utilizing divalent silver oxide with an average gassing rate of approximately 100 microliters per gram per hour in 18 percent sodium hydroxide solution at 165°F. Cell electrolyte was sodium hydroxide solution in concentrations from 2 to 42 percent by weight as seen below and saturated with zinc oxide. Cell height was measured initially and then after nine months of storage at room temperature (70°F) and humidity. Some cells were placed at elevated temperature of 113°F and 50 percent RH (relative humidity) for 12 weeks. The following cell expansion was recorded:

| Sodium Hydroxide Concentration (Weight %) | Cell Expansion (inch) After 9 Mos. At 70°F | 12 Weeks at 113°F/50%RH |
|---|---|---|
| 2 | .0010 | .002 |
| 6 | .0020 | .003 |
| 12 | .0025 | .005 |

-Continued

| Sodium Hydroxide Concentration (Weight %) | Cell Expansion (inch) After 9 Mos. At 70°F | 12 Weeks at 113°F/50%RH |
|---|---|---|
| 18 | .0030 | .007 |
| 24 | .0060 | .013 |
| 30 | .0070 | .016 |
| 36 | .0090 | .018 |
| 42 | .0105 | .025 |

Results show that cells stored for 12 weeks at 113°/50 percent RH made with sodium hydroxide concentration before 24 percent bulged below the cell expansion of 0.010 inch while those above 24 percent bulged more than 0.010 inch.

Since a watch cell should not expand beyond 0.010 inch in two years of storage at room temperature, and since elevated temperature of 113°F/50 percent RH is equivalent to two years of room temperature storage, it is clear that cells employing the electrolyte concentration range of this invention, i.e. from about 2 to about 20 percent of sodium hydroxide, satisfy this requirement while cells with concentrations outside the scope of the invention do not. Cells made with sodium hydroxide concentrations greater than 20 percent by weight can therefore be expected to expand beyond 0.010 inch after two years of storage at room temperature.

EXAMPLE 2

Cells of the present invention such as those of Example 1 were constructed with 18 percent sodium hydroxide plus 1.25 percent zinc oxide as the cell electrolytes were discharged at 6.5K, 10K, 50K and 100K ohm load at room temperature (equivalent to approximately 240, 157, 316 and 159 microampere per cell respectively) and were checked for capacity and voltage of operation. Cells discharged at 6.5K and 10K delivered their full capacity at 1.56 and 1.57 volts per cell while cells discharged at 50K and 100K delivered more than 75 percent of their capacity at 1.58 volts per cell without failing. It is expected that these cells will continue to deliver their full capacity at the same voltage level (1.58V/cell).

EXAMPLE 3

Cells (41 size; 0.455 inch dia., 0.160 inch height, and 0.026 in³ volume) were constructed according to FIG. 6 utilizing divalent silver oxide with an average gassing rate of 120 microliters per gram per hour in 18 percent sodium hydroxide solution at 165°F. Cell electrolyte was potassium hydroxide in concentrations from 5 percent to 46 percent by weight as seen below and saturated with zinc oxide. Cell height was measured initially and then after 6 weeks at room temperature and humidity. Also, some cells were placed at elevated temperatures of 113°F/50 percent RH, 130°F/50 percent RH, and 145°F/50 percent RH for 6 weeks. The following cell expansion was recorded.

| Potassium Hydroxide Concentration (Weight %) | Cell Expansion (inch) after 6 weeks at | | | |
|---|---|---|---|---|
| | Room Temp. | 113°/50% | 130°/50% | 145°/50% |
| 5 | 0 | 0 | | .0005 |

-Continued

| Potassium Hydroxide Concentration (Weight %) | Cell Expansion (inch) after 6 weeks at | | | |
|---|---|---|---|---|
| | Room Temp. | 113°/50% | 130°/50% | 145°/50% |
| 10 | 0 | 0 | .0005 | .0015 |
| 15 | 0 | .0005 | .0010 | .0025 |
| 20 | 0 | .0015 | .0025 | .0040 |
| 25 | .0005 | .0025 | .0050 | .0100 |
| 30 | .0005 | .0050 | .0070 | .0180 |
| 35 | .0010 | .0075 | .0095 | cell rupture |
| 40 | .0030 | .0090 | .0125 | " |
| 46 | .0050 | .0160 | .0185 | " |

Storing cells at elevated temperatures is one way of speeding up the evaluation of shelf life expectancy from a battery. With divalent silver oxide-zinc batteries storing cells at 113°F/50 percent, 130°F/50 percent and 145°F/50 percent for 6 weeks is equivalent to storing the same cells for one year, 1.5 years and 2 years at room temperature, respectively. Keeping this relationship in mind, the data in the table indicate clearly that cells made with potassium hydroxide concentration below 25 percent i.e. cells of the present invention, by weight will bulge below the maximum allowable expansion of 0.010 inch after 6 weeks at 145°/50 percent or the quivalent of 2 years of room temperature storage. Cells made with potassium hydroxide concentration higher than 25 percent by weight will bulge above the maximum allowable expansion of 0.010 inch after two years of room temperature storage.

EXAMPLE 4

Cells from Example 3 were discharged at 625, 6500, and 50,000 ohm load at room temperature (equivalent to 2.4, 0.24 and 0.03 milliampere per cell or 4.2, 0.42, 0.052 milliampere per square centimeter of active material, respectively) and checked for initial capacity.

| Potassium Hydroxide Concentration (Weight %) | Initial Cell Capacity (MAH/Cell) to 0.90V Cutoff | | |
|---|---|---|---|
| | 625 | 6500 | 50,000 |
| 5 | 42 | 70 | 142 |
| 10 | 72 | 142 | 142 |
| 20 | 136 | 142 | 142 |
| 30 | 139 | 142 | 142 |

Data in the table clearly indicate that the lighter the drain rate (high load) the higher capacity obtained. Cells with 5 percent potassium hydroxide as the electrolyte showed minimum expansion (Example 3) and maximum capacity at 50,000 ohm load. Cells with 10 percent potassium hydroxide as the electrolyte showed acceptable expansion (Example 3) and maximum capacity at 6500 ohm load. Cells with 30 percent potassium hydroxide as the electrolyte showed acceptable capacity but bulged severely after 6 weeks at 145°/50 percent for 6 weeks (Example 3).

EXAMPLE 5

To check for capacity retention, cells from Example 3 were discharged across 6500 ohm load at room temperature after being stored at room temperature and humidity, 113°F/50 percent RH, and 130°F/50 percent RH for 6 weeks. Data in the table below indicate a capacity retention of 97 to 98 percent for cells stored at room temperature for 6 weeks and with potassium hydroxide electrolyte concentration of 10 to 46 percent by weight. Cells with 10 to 30 percent potassium hydroxide and stored at 113°F/50 percent for 6 weeks retained 93 to 94 percent of their original capacity. The same cells with 46 % potassium hydroxide showed only 60 percent of their original capacity.

| Potassium Hydroxide Concentration (Weight %) | Percent Capacity Retention After 6 Weeks of Storage at | | |
|---|---|---|---|
| | Room Temp. | 113°/50% | 130°/50% |
| 10 | 98 | 94 | 93 |
| 15 | 97 | 93 | 93 |
| 20 | 97 | 94 | 90 |
| 30 | 97 | 93 | 70 |
| 46 | 97 | 60 | — |

The poor capacity retention of cells made with 46 percent potassium hydroxide was attributed to the severe bulging of cells stored at 113°/50 percent for 6 weeks. Cells of this invention with 10 to 20 percent potassium hydroxide and stored at 130°/50 percent for 6 weeks retained 90 to 93 percent of their original capacity. The same cells with 30 percent potassium hydroxide outside the scope of this invention showed only 70 percent of their original capacity due to cell bulging. Cells made with 46 percent potassium hydroxide outside the scope of this invention failed to discharge across 6500 ohm load after 6 weeks of storage at 130°/50 percent. These cells were severely damaged by the gas evolved. In summary, it is only the cells of this invention made with 10 to 20 percent potassium hydroxide as the electrolyte, that gave acceptable capacity retention after storage at elevated temperatures.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. A sealed low drain rate cell comprising in combination
   a. an electronegative metal anode;
   b. an alkali metal hydroxide electrolyte;
   c. a cell barrier; and
   d. an in situ stable divalent silver oxide depolarizer, wherein the in situ stable divalent silver oxide depolarizer has a maximum gassing rate of 500 microliters/gram/hr. in a 2 percent potassium hydroxide solution at 165°F., and wherein when the metal hydroxide in the electrolyte is:
      i. sodium hydroxide, the weight percent concentration of the sodium hydroxide in the electrolyte is from about 2.0 percent to about 20.0 percent;
      ii. lithium hydroxide, the weight percent concentration of the lithium hydroxide in the electrolyte is from about 1.2 percent to about 13.0 percent;
      iii. potassium hydroxide, the weight percent concentration of the potassium hydroxide in the electrolyte is from about 3.0 percent to about 25.0 percent;
      iv. rubidium hydroxide, the weight percent concentration of the rubidium hydroxide in the electrolyte is from about 5.0 percent to about 40.0 percent;

v. cesium hydroxide, the weight percent concentration of the cesium hydroxide in the electrolyte is from about 7.5 percent to about 50.0 percent.

2. A cell according to claim 1 having a drain rate of from about 1 microampere to about 1 milliampere/cm² of active material.

3. A cell according to claim 2 wherein the metal of the anode is zinc.

4. A cell according to claim 3 wherein the zinc is a gelled zinc.

5. A cell according to claim 3 wherein the zinc is a semi-gelled zinc.

6. A cell according to claim 2 wherein the metal hydroxide of the electrolyte is sodium hydroxide.

7. A cell according to claim 2 wherein the metal hydroxide of the electrolyte is potassium hydroxide.

8. A cell according to claim 2 wherein the metal hydroxide of the electrolyte is lithium hydroxide.

9. A cell according to claim 2 wherein the metal hydroxide of the electrolyte is rubidium hydroxide.

10. A cell according to claim 2 wherein the metal hydroxide of the electrolyte is cesium hydroxide.

11. A cell according to claim 2 wherein the maximum gassing rate is 100 microliters/gram/hour.

12. A low drain rate power system comprising in combination:
  a. a power consuming device; and
  b. a sealed low drain rate cell in electrical contact therewith, said low drain rate cell comprising;
   i. an electronegative metal anode;
   ii. an alkali metal hydroxide electrolyte;
   iii. a cell barrier; and
   iv. an in situ stable divalent silver oxide depolarizer,
  wherein the in situ stable divalent silver oxide depolarizer of the sealed cell has a maximum gassing rate of 500 microliters/gram/hour in a 2% potassium hydroxide solution at 165°F., and wherein when the metal hydroxide in the electrolyte is:
   i. sodium hydroxide, the weight percent concentration of the sodium hydroxide in the electrolyte is from about 2.0 to about 20.0 percent;
   ii. lithium hydroxide, the weight percent concentration of the lithium hydroxide in the electrolyte is from about 1.2 to about 13.0 percent;
   iii. potassium hydroxide, the weight percent concentration of the potassium hydroxide in the electrolyte is from about 3.0 to about 25.0 percent;
   iv. rubidium hydroxide, the weight percent concentration of the rubidium hydroxide in the electrolyte is from about 5.0 to about 40.0 percent;
   v. cesium hydroxide, the weight percent concentration of the cesium hydroxide in the electrolyte is from about 7.5 to about 50.0 percent.

13. A system according to claim 12 wherein the drain rate of this cell is from about 1 microampere to about 1 milliampere/cm² of active material.

14. A system according to claim 13 wherein the metal of the anode of the sealed cell is zinc.

15. A system according to claim 13 wherein the metal hydroxide of the electrolyte of the sealed cell is sodium hydroxide.

16. A system according to claim 13 wherein the metal hydroxide of the electrolyte of the sealed cell is potassium hydroxide.

* * * * *